J. E. PRUYN.
BALL BEARING.
APPLICATION FILED APR. 19, 1916.
1,340,250.
Patented May 18, 1920.
2 SHEETS—SHEET 1.
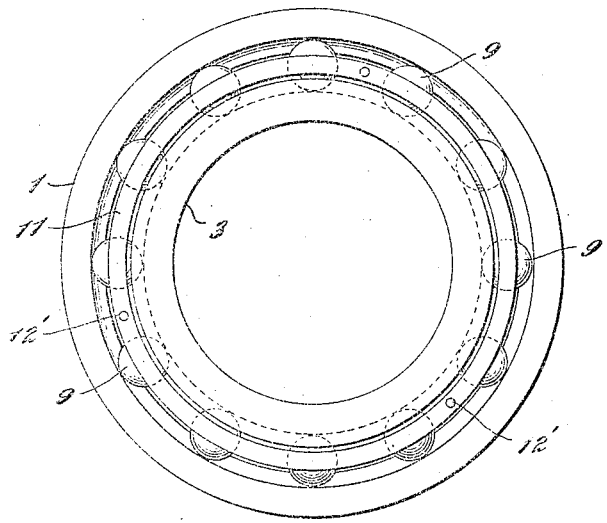
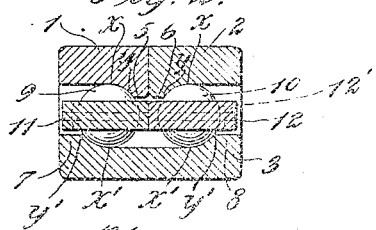
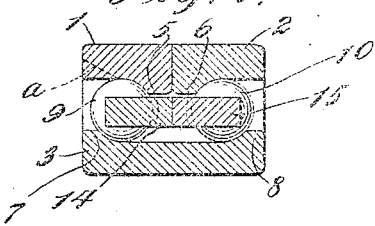
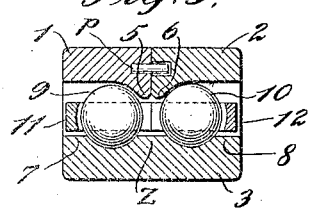
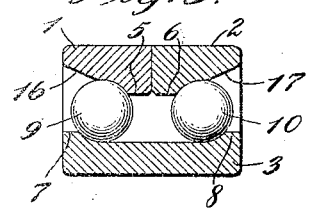
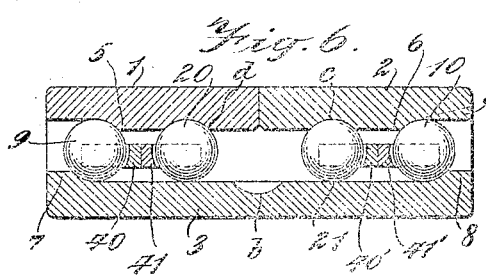
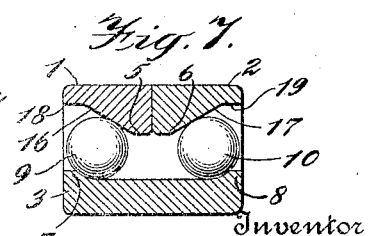
Inventor
John Ernest Pruyn
By his Attorneys
Rosenbaum, Stockbridge & Borst

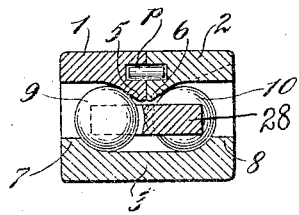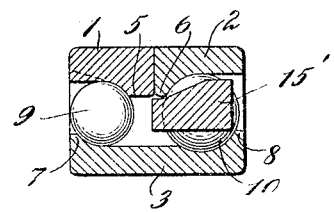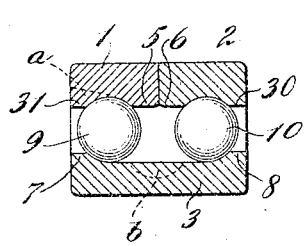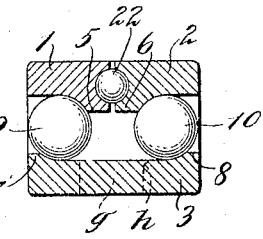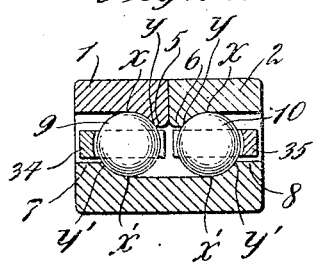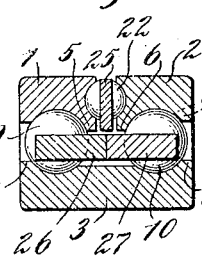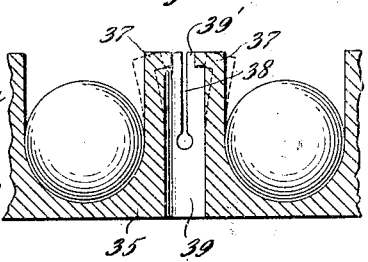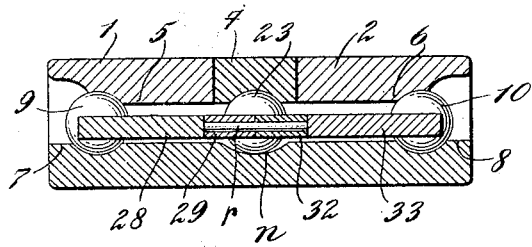

UNITED STATES PATENT OFFICE.

JOHN ERNEST PRUYN, OF PHILADELPHIA, PENNSYLVANIA, ASSIGNOR OF ONE-HALF TO EMILY C. PRUYN, OF PHILADELPHIA, PENNSYLVANIA.

BALL-BEARING.

1,340,250.   Specification of Letters Patent.   Patented May 18, 1920.

Application filed April 19, 1916. Serial No. 92,201.

*To all whom it may concern:*

Be it known that I, JOHN ERNEST PRUYN, a citizen of the United States, residing at Philadelphia, in the county of Philadelphia and State of Pennsylvania, have invented certain new and useful Improvements in Ball-Bearings, of which the following is a full, clear, and exact description.

This invention relates to ball bearings and more particularly to the type of ball bearing which comprises a plurality of concentric annular rings having two or more rows of balls interposed between them and rolling in races or on paths on their opposing surfaces, the axis of rotation of some of the rows of balls being more or less oblique to the axis of rotation of the bearing. This type of ball bearing has been found to be peculiarly applicable to use where it is desired to have a bearing which will carry a thrust as well as a radial load, for, by providing two or more rows of balls as aforesaid, one or more rows of balls will take care of the thrust load, while the other row or rows will carry the radial load.

The general object of my invention is to produce a bearing of this character, the parts of which can be easily manufactured, have the required accuracy and are readily assembled to provide a unitary anti-friction bearing which will satisfy the requirements of commercial use.

More specifically stated, one of the objects of my invention is to eliminate the difficulties which are at present experienced in accurately grinding a plurality of ball races upon the inner surface of the outer ring of a bearing, without reference to the distance between the centers of the rows of balls. As is well known, the two methods of grinding these ball races are:—to use a wheel whose grinding surface is the exact complement of the contour of the ball race to be cut, this method is objectionable for the slightest wearing of the grind wheel will cause inaccuracies in the grinding of the race; to use a radial or an oscillating grinder, this method is objectionable on account of the difficulties experienced in grinding the ball races radially and concentrically true one to the other. This is a fact for the reason that unless both ball races are ground without removing the annular ring from the chuck or other device which carries or holds the rings, the races may be slightly eccentric one to the other, so that when the bearing is assembled, this eccentricity will cause a binding of the parts. The trouble in using a radial oscillating grinder occurs in grinding the inner one of the ball races since the diameter of the bearing is usually not of sufficient size to permit a free movement of the grinding wheel and its spindle. However, if this objection can be eliminated, then this latter method of producing the races is preferable since the ball races may be ground with the nicest degree of accuracy and with the greatest ease and facility.

Another object of my invention is to provide a bearing in which, should there be a slight eccentricity of the races in the assembled bearing, this eccentricity will not cause a binding action of the different parts.

Another object of my making the one ring into a plurality of sections is to provide a unitary ball bearing which contains a plurality of elements for mounting movable parts thereon any of which that may be desired can turn independently of the others in the same or reverse directions.

Another object of my invention is to provide a unitary ball bearing with a plurality of rows of balls which will not completely fail to operate if a ball breaks, or a foreign substance wedges and locks one of the rows of balls on the ring, but will allow the other row or rows of balls to carry and support the load.

To carry out these objects, I propose to make one of the rings, as heretofore used, in a plurality of sections whereby the ball race on each section may be separately ground.

My invention also consists in forming the ball races upon two of the sections of the divided ring so that the races on the sections and upon the other ring will by the coaction of the balls hold the sections of the divided ring together and not require these parts to be secured together by a positive connector. This is important for the reason that should there be a slight eccentricity in the ball races of the sections when the ball bearing is assembled (which may occur since the sections of the ring are separately ground), the fact that there is no positive connector between the sections permits them to have a slight independent adjusting movement, so the balls will not bind as would be the case if the sections were formed as an integral structure. To cause the co-action of the balls with the ball paths or races to hold the abutting sections of the sectional ring together, the ball paths or races are formed by at least two annular ribs on the surface of the integral ring confronting an annular rib on the surface of each of the two outer sectional rings. The co-action of the balls with the opposing surfaces of these ribs hold the sections toward each other and in abutting relationship.

My invention will also be understood from the description and embodiment of several forms of ball bearings illustrated in the accompanying drawings which form part of this specification.

Figure 1 shows an end elevation of one type of bearing constructed in accordance with the principles of my invention.

Fig. 2 is a radial section through the same;

Figs. 3 and 4 are radial sections of slightly modified forms;

Fig. 5 is a section of a different form of bearing, the spacer for the balls being omitted;

Fig. 6 is a section of a type of bearing of a slightly different form to that shown in Fig. 5.

Figs. 7 to 14, inclusive, are sections of different modifications, the views also showing different forms of separator; and Fig. 15 is a detail of the separator or spacer shown in Fig. 14.

Referring first to all of the different forms illustrated, it will be seen that they have characteristic features which are common to all of them, each one comprising concentric annular rings, the one being formed of two or more abutting sections of which two are designated 1 and 2, and the other one being an integral ring and designated 3. The sections 1 and 2 of the sectional ring are each provided with at least one annular shoulder or rib on its surface with a ball path or race thereon facing outwardly, the two shoulders or ribs being respectively designated 5 and 6. The integral ring 3 is also in each modification provided with at least two shoulders or ribs respectively designated 7 and 8, each having a ball path or race facing inwardly. Interposed between these two pairs of ball paths or races are two rows of balls designated 9 and 10 which balls roll or rotate on the ball paths or races and co-act with the annular shoulders or ribs formed thereby. That is, the balls 9 of one row co-act with the shoulders or ribs 5 and 7 formed by one pair of ball paths or races, and the balls 10 of the other row co-act with the shoulders or ribs 6 and 8 formed by the other pair of ball paths or races. The ball paths or races on each set of shoulders or ribs are diagonally opposite to each other and will therefore when the bearing is assembled, by co-acting with the balls hold the sections 1 and 2 of the sectional ring in abutting relationship one with the other, or with an intermediate part, without fastening or securing the sections together by a positive connector, for as will be clear from any of the sections shown, any tendency of the sectional rings 1 and 2 to separate will be prevented by the balls engaging the shoulders or ribs as described. The sections 1 and 2 of the sectional ring may have a slight lateral movement relative to each other, if desired, by spacing the shoulders on the integral ring apart sufficiently to permit a slight play of the balls in the ball paths or races. The ball paths or races on the sections of the sectional ring are ground separately and as it is extremely difficult to obtain the same setting in the chuck for both sections, there may be some slight eccentricity between the ball paths or races in sections 1 and 2 when the bearing is assembled, but this is unimportant for the reason that since the sections 1 and 2 are not positively connected, they will be permitted a sufficient relative movement to compensate for any such eccentricity, which would not be true if sections 1 and 2 were made integral or with a positive connector.

In the form of bearing shown in Figs. 1 and 2, the ball races in the sections 1 and 2 are formed on the surfaces of the shoulders 5 and 6 respectively, and constitute well defined annular paths of which the curvature practically conforms to that of the ball used, from $y$ to $x$ and at $x$ merging into a smooth annular surface. The two ball races on the ring 3 are formed on the surface of the shoulders 7 and 8 and constitute well defined annular paths of which the curvature practically conforms to that of the ball used from $y_1$ to $x_1$ and at $x_1$ merging into smooth annular surfaces. In this form, the rows of balls 9 and 10 are of a size to entirely fill the space between the ball races or paths provided, and the sections 1 and 2 are thus held in abutting relationship. These sections may, however, have a slight relative movement if any great strains or stresses are set up, due to the inequality of the load upon either of the sets of balls, or a slight eccentricity between their race-ways.

The balls are introduced into the raceways in this form by first axially or laterally shifting one of the sections relatively to the integral ring 3, as for example by shifting the section 1 toward the right, which will permit the row of balls 9 to be introduced. The section 2 is then placed abutting section 1 and may be clamped thereto if desired, and the ring 3 is then tilted with respect to the two sections in such a direction that the width of the opening at a point on section 2 diametrically opposite to the assembled balls in section 2 is increased, which will provide a sufficient space for the balls 10 of the other row to be pressed into the race formed in section 2. In this manner the number of balls that may be introduced between the rings depends upon the height of the shoulders forming the races. The balls in each row are then distributed and held apart by suitable spacers or cages.

In the form shown in Fig. 2, this spacer is composed of two annular rings 11 and 12 which are adapted to be inserted between the balls after the bearing has been assembled. Each of these rings has slots or recesses in its inner edge, which slots aline with each other to provide elongated openings in which one ball from each row is adapted to be positioned. The two rings are held together by pins 12' or other suitable fasteners which causes both rows of balls to travel at a uniform speed.

Where it is desired to utilize a greater number of balls in each race-way, a charging opening may be provided in one of the rings, as shown in Fig. 4, and indicated by $a$ at the dotted line in sectional ring 1, in which instance the desired number of balls of the row 10 are first inserted between one of the sections and the integral ring 3, as for example by laterally shifting the section 2 to the left. Then the section 1 is placed in abutting relationship thereto, and by utilizing the charging or filling opening $a$ the proper number of balls may be pressed or pushed into the race-way formed upon the section 1. In this manner, the race-ways may be entirely filled with balls or, if desired, only partially filled and a proper separator installed. It may here be stated that there is no necessity of making the charging or filling opening extend the full depth of the race, for, on account of the elasticity of the metal forming the rings and the slight independent action between all the parts, the balls may be pushed or forced into the race-way, and in this manner the portion of the race-way with which the balls contact in their travel is not interrupted. After the balls are all in place, the pressure being removed, the rings will assume their natural position and the race-ways will confine the balls, making a unitary commercial bearing.

In the form shown in Fig. 4, a slightly modified form of spacer is used consisting of two annular rings 14 and 15 having their inner faces in abutting relationship and recesses formed in their outer faces to receive the balls. These spacers must necessarily be inserted in place before the balls of the row 9 are inserted through the filling opening $a$. The rings forming the spacer shown in Fig. 4 are not secured together permitting independent movement of each row of balls and its separator. An advantage of this construction of a bearing having a divided ring and a divided separator, is that if for any cause, such as a ball breaking or any foreign substance wedging and locking one of the rows of balls on its sectional ring, so that the balls cannot rotate, and the sectional ring fails to operate the load will be supported and carried by the other sectional ring and its row of balls, thereby preventing the complete failure of the bearing. Another advantage of this construction is that each sectional ring and its row of balls and separator is independent and can turn independently of the other section or sections in the same or reverse direction.

The construction shown in Fig. 3 is slightly a different form from that shown in Figs. 2 and 4, in that a pin or pins $p$, or other means, are used to cause both sectional rings to travel together, also one of the rows of balls, as for example, the row 10, has a slight amount of clearance in the race-ways, while the balls of the row 9 bear upon both races and are in positive contact therewith at all times. This construction permits a slight relative lateral movement of the sections 1 and 2 in a direction parallel to the axis of rotation of the bearing depending upon the amount of clearance between the balls of the row 10 and their races, but nevertheless, the sections 1 and 2 will be held together by the co-action of the balls with the shoulders formed upon the two sections and the integral ring, as previously described. The annular rib $z$ on the integral ring 3 between the row of balls 9 and 10 is not essential to the proper working of this bearing, but may be used in this or other modifications of my invention for the sake of strength or for other purposes.

The forms shown in Figs. 5 and 7 are also utilized to insert any desired number of balls in each race-way up to the number that will completely fill the circumference of the races, and to do this without providing a charging opening. This is accomplished by reducing the outer edges of the sections 1 and 2 of the sectional ring at 16 and 17 whereby the annular space between the integral ring and the sections at the point at which the balls are inserted, is increased. The introduction of the balls in these forms is effected by tilting the rings in the manner before described and by varying the temperature of the rings as well as utilizing the natural elasticity and resiliency of the metal forming the rings, together with the slight independent movement between the parts under pressure. When the pressure is removed and conditions become normal the rings will confine the balls in their respective races, making a unitary bearing. While both of the sections 1 and 2 are shown cut away at 16 and 17 respectively, it is obvious that only one such section need be cut away, since there is no trouble in filling the first race-way by the lateral movement of the rings.

Fig. 7 differs from Fig. 5 in that instead of increasing the distance between the external edges by providing the inclined annular surfaces 16 and 17, circumferential or lateral recesses 18 and 19 are provided, which will serve the same purpose. The shoulders 5 and 6 in the form shown in Fig. 5 follow the curvature of the balls, while in Fig. 7 these shoulders present flat surfaces upon which the balls rotate.

The form shown in Fig. 6 is especially adapted for automobiles or in constructions where the ball bearing is subjected to a comparatively heavy radial load, and is also subjected to an intermittent thrust load in either direction, as for instance, when an automobile wheel is trying to leave car tracks, or is turning corners, etc. The rows of balls 9 and 10 are spaced as far apart as is practicable, and if desired additional rows of balls 20 and 21 may be provided, which balls rotate in suitable race-ways formed on the ring 3 and upon the sections 1 and 2. In the form shown, the race-ways in the sections 1 and 2 are grooved and follow the curvature of the balls, but this is essential only to maintain the balls in position. Where such a construction is used a recess such as is indicated by $b$ may be used to insert the balls of the rows 20 and 21 into position. The recess $b$ is made to the same depth or a greater depth than the races $c$ and $d$ and sufficiently large to receive one ball at a time and permit the rings to pass axially over the ball contained therein and thus the ball is permitted to enter the inner race $c$ in section 2. When the desired number of balls is placed in race $c$ the section 2 with the balls contained in its race is moved to the right sufficiently to allow the process to be repeated on sectional ring 1.

When both inner races $c$ and $d$ have been filled with the desired number of balls, both sections and the balls are moved axially on the integral ring to the right sufficiently to insert the separators 41 and 40 when used, and the row of balls 9. The sections are then moved back toward the left with their balls and separators and the separators 40' and 41' may be placed in position in sectional ring 2 and the balls in the row 10 inserted through the filling opening $a$.

The insertion of the two inner rows of balls 20 and 21 as above, may be facilitated at the expense of some strength by making an annular groove around the integral ring similar to the recess $b$ to correspond with the inner races in the sectional rings 1 and 2. Then all the balls which will completely fill the inner race in the section except one may be inserted at the same time. These are then held apart in the sectional ring and the ring moved to the groove $b$ to receive the last ball (if no separator is to be used). The grooves $c$ and $d$ may be very shallow and the internal outside edges of the sections 1 and 2 may be relieved, as in Fig. 5, at 16 and 17. Then the whole bearing may be assembled without a filling opening or groove for I propose to make allowances on the various dimensions, for the use of the principles of expansion and contraction caused by variations in temperature either by immersing one part in a hot bath and the other part in a cold bath or by passing a charge of electricity through the one ring while assembling. By using these, and with the aid of the natural elasticity and resiliency of the metal composing the rings, I make a bearing of this type with the races completely filled with a plurality of rows of balls, or balls with a separator without a filling opening, that is, with rings having uninterrupted annular surfaces and a bearing which cannot be disassembled without ruining some portion of the bearing.

The construction shown in Fig. 8 is slightly different from that shown in Figs. 2 and 4 in that the curvature of the races is an arc of a circle having a larger radius than that of the ball used, making the bearing somewhat more flexible. The separator 24 shown in this figure is an integral ring having recesses in its faces to receive the balls in a staggered relationship to the balls in the other row. This separator is applicable where it is desired to have the rows of balls very closely together or even overlapping each other, and the pin or pins $p$, which fit loosely in recesses in the rings 1 and 2, should be used to cause them to travel in unison.

The form shown in Fig. 9 is a special modification. The balls in row 10 in the sectional ring 2 are materially larger than the balls in row 9 in section 1 and the separator 15' is used in one side only. In this modification the row of balls 10 is inserted by lateral displacement of the rings, the separator being inserted between the balls, then sufficient balls to completely fill the ball paths or races in section 1 are inserted through the charging opening $a$. It is obvious I can use different combinations of ball sizes in my invention to meet different requirements or uses.

In the modification shown in Fig. 10 for the sake of strength and for other reasons, the ribs 30 and 31 are added and the recess $b$ provided for the insertion of the balls in row 10 and the charging opening $a$ for the insertion of the balls in row 9.

The form shown in Figs. 11 and 12 are constructed with annular races in the opposing faces of the sections 1 and 2. In these races are interposed the thrust balls 22, which provide anti-friction bearings between the two sections of the sectional rings 1 and 2 which co-acting with the balls 9 and 10 retaining the rings in abutting relationship upon the balls 22, thereby reduce the friction between the sections 1 and 2 and thus cause this type of bearing to be especially adapted to provide means for different speed of travel in either a forward or reverse motion between the sections 1 and 2.

In the form shown in Fig. 11 the row of balls 9 is introduced by laterally displacing the rings, as hereinbefore described, then the balls in row 22 are placed in the race in the sectional ring 1, sectional ring 2 being placed in position, the balls in row 10 are inserted through the hole $g$ in the integral ring 3 which has a filling notch $h$ leading to the ball races between section 2 and the ring 3. When the balls have been introduced into the races under pressure the elasticity of the metal composing the rings and the flexibility of the parts retains the balls in the races.

The form shown in Fig. 12 is similar to that shown in Fig. 11, in that it contains a row of balls 22, between the confronting faces of the sectional rings 1 and 2 which is carried by an independent separator 25. In this form independent separators 25, 26 and 27 are shown carrying all of the rows of balls. The row of balls 9 is inserted by placing the sectional ring 1 and the integral ring 3 either eccentric or tilted with respect to one another, as hereinbefore described. The separators 25 and 26 being inserted into place and the row of balls 22 being placed into position with separator 27 also in place, the sectional ring 2 is placed thereon, and the row of balls 10 introduced through the charging opening $a$, into the openings of the separator 27. In this construction the separators 25 and 26 and 27 are independent and all have a sufficient clearance to revolve freely and independently of one another under all conditions.

The form shown in Fig. 13 is similar to that shown in Fig. 5, with the exception that one of the concentric rings is divided into 3 sections, and the third row of balls 23 runs in annular ball paths or races in the confronting faces of ring section 4 and the integral ring 3. One of these ball races, as $n$ in the ring 3, has a larger radius than the ball therein allowing a certain amount of lateral movement under a thrust load for the purpose of permitting the balls 9 and 10 to carry any thrust of the load in either direction. The separators shown consist of four annular rings, 28, 29, 32 and 33, with suitable recesses on their edges to hold the balls; of these rings, 29 and 32 are held together by pins $r$, or other suitable means and turn as a unit and there is no positive connector between this unit and the two end separator rings 28 and 33, which allows each of the sectional rings 1, 2 and 4, with their rows of balls 9, 10 and 23 respectively, and the separators of each, 28, 33, and the unit 29, 32, respectively, to travel independently of one another.

In Fig. 14 the type of bearing shown in Fig. 2 is illustrated in connection with a different form of separator which comprises two separate rings 35 and 36. Each of these rings is adapted to be inserted between the balls from the outside, and after it is in position the ends of the grooves which have been designated 37, in Fig. 15 are bent around the ends of the balls to hold them in place. One method in which the ends may be bent around the balls after the ring is in place, is shown by Fig. 15, the construction shown therein comprising a slot in the ridge or peak between two of the recesses in which the balls fit. Extending axially through the ring and communicating with the slot 38 is a circular hole or aperture 39 which is of reduced diameter at the inner end of the ring, as at 39'. The ring in the form in which it is inserted between the balls, is shown in full lines, and after it is so positioned a punch or other instrument having a pointed end is inserted through the hole 39, with its end projecting through the reduced portion. This implement is then driven inwardly sufficiently to cause the pointed end to project entirely through the opening 39' whereby the bevel upon the pointed end of the tool will cause the end of the peak to spread, due to the slot 38 therein, so that the ends are bent around the balls, as shown in dotted lines. The amount which the arms of the bifurcated end of the peak need be separated is slight. One of the advantages of utilizing this type of separator is that the sections 1 and 2 of the ring may then turn freely with respect to each other and the balls have a correspondingly free movement. This is impractical with the form of separator shown in Figs. 2 and 3, for the reason that the pins 12 which unite the two rings or halves of the separator so unite these halves that a common recess is provided in the ring for one of the balls of each row, which construction, as is obvious, will prevent independent rotation of the two sections 1 and 2.

While different forms of separators or spacers have been shown in connection with the different modifications it is apparent that these separators may be used interchangeably with the different modifications, and it is not the intention to limit the invention to any particular form of separator except where it is so specifically stated in the claims.

Numerous other constructions of my invention may be utilized which will suggest themselves for other purposes to those versed in the art, and it is not my intention to limit the invention to the specific constructions shown. While I have shown in the drawings my invention in each instance as having the outer ring containing the two sections 1 and 2, which is the preferable construction owing to the facility with which the races may be ground in these sections, yet it is obvious that the same result is attained when the inner ring is made in a plurality of sections.

I claim:

1. A ball bearing comprising two concentric rings, one of said rings consisting of a plurality of separate integral annular sections lying substantially in contact with each other without intervening spacing means, said rings having diagonal confronting ribs on their faces, and rows of balls between said rings co-acting with said ribs to hold the sections together.

2. A ball bearing comprising two concentric rings, one of said rings consisting of a purality of separate integral annular sections lying substantially in contact with each other without intervening spacing means, said rings having diagonal confronting ribs on their faces forming at least a portion of the respective races, and a plurality of rows of balls between said rings co-acting with said ribs to hold the sections together.

3. A unitary ball bearing comprising two concentric rings having ball races on their confronting faces, and balls in said races, one of said rings consisting of a plurality of separate integral annular sections lying substantially in contact with each other without intervening spacing means, any two of said sections turning freely with respect to each other, and said balls co-acting with said races to prevent the separation of the sections.

4. A unitary ball bearing comprising two concentric rings with ball paths or races on their confronting faces, one of said rings consisting of a plurality of integral annular sections lying substantially in contact with each other without intervening spacing means, a plurality of rows of balls in said races the axis of rotation of at least one row of said balls being oblique to the axis of the shaft.

5. A ball bearing comprising two concentric rings, one of said rings consisting of a plurality of separate integral annular sections lying substantially in contact with each other without intervening spacing means, said rings having ball races provided with shoulders, and balls between said races, one of said ball races having a shoulder on one side only whereby one row of balls may be inserted when the rings are displaced laterally.

6. A ball bearing comprising two concentric rings, one of said rings being an integral structure, the other of said rings consisting of a plurality of integral annular sections lying substantially in contact with each other without intervening spacing means, ball paths on the confronting faces of said integral ring and said sections, and balls in said paths co-acting with said paths to prevent the separation of said sections.

7. A ball bearing comprising two concentric rings, one having a plurality of ribs on one face thereof and the other consisting of a plurality of separate integral annular sections lying substantially in contact with each other without intervening spacing means, and each of said sections having a diagonal rib on one face confronting one of the ribs on the other ring, and rows of balls between said rings co-acting with the ribs thereon to hold the sections together.

8. A unitary ball bearing comprising three or more concentric rings, at least two of said rings being arranged in abutting relationship and having outwardly facing ribs thereon and the other of said rings having inwardly facing ribs thereon, ball races on the confronting faces of said ribs, and balls in said races, any two of said rings being independently rotatable in the same or opposite directions.

9. A unitary ball bearing comprising an integral ring and a plurality of integral rings concentric therewith, a pair of confronting ball races on the face of said integral ring and each of said plurality of rings, a row of balls in each pair of races, and ribs forming a part at least of said ball races coacting with the balls to limit the lateral movement of said plurality of rings.

In witness whereof, I subscribe my signature in the presence of two witnesses.

JOHN ERNEST PRUYN.

Witnesses:
 LAMPIETRO COIMO,
 JOHN McCULLOGH.